(12) United States Patent
Yoshinobu

(10) Patent No.: US 8,838,514 B2
(45) Date of Patent: Sep. 16, 2014

(54) OPTIMAL TECHNIQUE SEARCH METHOD AND SYSTEM THAT CREATES A VIRTUAL CELL DIVISION SPACE TO CREATE/FORM A NEURAL NETWORK

(76) Inventor: Masayuki Yoshinobu, Tokyo (JP)

( * ) Notice: Subject to any disclaimer, the term of this patent is extended or adjusted under 35 U.S.C. 154(b) by 302 days.

(21) Appl. No.: 13/508,908

(22) PCT Filed: Nov. 10, 2009

(86) PCT No.: PCT/JP2009/069139
§ 371 (c)(1),
(2), (4) Date: Jun. 27, 2012

(87) PCT Pub. No.: WO2011/058621
PCT Pub. Date: May 19, 2011

(65) Prior Publication Data
US 2012/0271783 A1   Oct. 25, 2012

(51) Int. Cl.
*G06E 1/00* (2006.01)
*G05B 13/02* (2006.01)
*G06N 3/08* (2006.01)

(52) U.S. Cl.
CPC .............. *G06N 3/086* (2013.01); *G05B 13/027* (2013.01)
USPC .......................................................... 706/26

(58) Field of Classification Search
USPC ................................................. 706/15, 26, 44
See application file for complete search history.

(56) References Cited

U.S. PATENT DOCUMENTS 5,515,477 A  *  5/1996 Sutherland ...................... 706/41

FOREIGN PATENT DOCUMENTS

| JP | 9-006881 A | 1/1997 |
|---|---|---|
| JP | 2003-317073 A | 11/2003 |
| JP | 2004-139606 A | 5/2004 |
| JP | 2006-323657 A | 11/2006 |

OTHER PUBLICATIONS

Kunio, Kaneko, What is life?—Introduction to complex systems biology, University of Tokyo Press, 2003.
Susumu Maruno, "Tekio Zoshoku Ryoshika Neuron (ASQA) ni yoru Moji Ninshiki", IEICE Technical Report, Oct. 28, 1991, vol. 91, No. 302, pp. 23-28.
Yoshiaki Ichikawa, "Identeki Algorithm to Men'eki System Ron GA no Mechatronis eno Oyo", Mathematical Sciences, Nov. 1, 1992, vol. 30, No. 11, pp. 32-37.

* cited by examiner

*Primary Examiner* — David Vincent
(74) *Attorney, Agent, or Firm* — McGlew and Tuttle, P.C.

(57) ABSTRACT

Disclosed are an optimal technique search method and system that can enable a more effective search for optimal techniques for problem solutions than in the past through the use of a neural network employing genetic algorithm. Provided therein are an execution unit (1) that uses a neural network employing a genetic algorithm to search for an optimal technique and which executes operations using said technique, and an evaluation unit (2) that, along with creating initial setting to transmit to said execution unit, evaluates the content of the operations of the execution unit after the operations have been executed and has the execution unit (1) execute operations a plurality of times, and thereby derives as the optimal technique the initial settings that executed the most effective operation when transmitted to the execution unit (1) out of the results derived from said plurality of operation executions. As a result, a small scale and effective optimal technique search becomes possible when using a neural network, as described in [0024] and [0025].

18 Claims, 6 Drawing Sheets

US 8,838,514 B2

OPTIMAL TECHNIQUE SEARCH METHOD AND SYSTEM THAT CREATES A VIRTUAL CELL DIVISION SPACE TO CREATE/FORM A NEURAL NETWORK

TECHNICAL FIELD

The present invention relates to an optimal technique search method and an optimal technique search system that apply a cell differentiation algorithm to a neural network, thereby effectively deriving an optimal technique for solving problems.

BACKGROUND ART

A structure in which a neural network is incorporated into a system has the advantage of deriving an optimal technique for solving problems by the repeated learning of nodes forming the neural network in the neural network.

In the learning of the neural network, the content of the technique is not limited. Therefore, it is expected that the learning of the neural network will be applied to various fields in the future.

In particular, a system in which a genetic algorithm is applied to the neural network has been used as a technique for deriving the accurate result in various fields from image processing to robot control, as described in Patent Literature 1 or Patent Literature 2.

Patent Document 1: Japanese Patent Application Laid-Open (JP-A) No. 9-006881
Patent Document 2: JP-A No. 2003-317073

DISCLOSURE OF THE INVENTION

Problems to be Solved by the Invention

However, in general, in the technique in which the genetic algorithm is applied to the neural network, a search is performed without discrimination between phenotype and genotype. Therefore, search efficiency is low and the number of nodes increases, which results in an increase in the search time.

A considerable number of searches for a long time cause an increase in the size of the system. When the genetic algorithm is used, the system can be applied to only a large company or research institute in terms of costs and installation sites.

Therefore, it is difficult to achieve the neural network in the system of, for example, a relatively small company or a development site.

The main objects of the invention are as follows.

That is, a first object of the invention is to provide an optimal technique search method and an optimal technique search system, which use a cell differentiation mechanism as an algorithm and perform learning at a predetermined level in advance to improve search efficiency, thereby deriving an optimal technique.

Means for Solving the Problems

A second object of the invention is to provide an optimal technique search method and an optimal technique search system that simplify a search process and can incorporate a neural network to which a genetic algorithm is applied as software.

In order to achieve the objects, a method according to the invention adopts a characteristic technique which recognizes environmental conditions as data in an arbitrary environment, applies the data to a neural network which is set and generated in advance to perform an operation corresponding to the environmental conditions, performs the operation plural times, and derives settings capable of performing the most effectively operation among the plurality of operations as an optimal technique.

In order to achieve the objects, a system according to the invention adopts a technical unit including an execution device that is initially set in an arbitrary environment so as to derive and perform an operation corresponding to the environment using a neural network and an evaluation device that gives the initial settings to the execution device and evaluates the content of the operation of the execution device after the operation ends. The evaluation device directs the execution device to perform the operation plural times and searches for the initial settings of the execution device in which the most effective operation is performed from the plurality of derived operation results.

Specifically, in solutions for problems, the invention adopts the following new characteristic unit in the range from a superordinate concept to a subordinate concept, thereby achieving the objects.

That is to say, a first feature of the method of the present invention is to employ an optimal technique search method that is performed in a system including an execution device that is initially set in an arbitrary environment so as to derive and perform an operation corresponding to the environment using a neural network and an evaluation device that gives the initial settings to the execution device and evaluates the content of the operation of the execution device after the operation ends, the evaluation device directing the execution device to perform the operation plural times and deriving the initial settings of the execution device in which the most effective operation is performed from the plurality of derived operation results as an optimal technique, the method comprising: an individual defining step of allowing the evaluation device to make initial settings from a combination of a virtual cell (node) and a molecule (numerical expression group) required for cell division and transmit the initial settings to the execution device; an execution device operating step of allowing the execution device to create a virtual cell division space based on the initial settings, arrange the nodes included in the initial settings, perform a calculation process based on the function to divide the nodes, thereby forming a neural network, input input data detected by a sensor provided therein to the neural network after the neural network is formed, thereby deriving output data, operate an operation unit provided therein based on the output data, and transmit the operation result to the evaluation device; and an individual evaluating step of allowing the evaluation device to create individual evaluation for the execution device based on the received operation result, wherein the individual defining step, the execution device operating step, and the individual evaluating step are sequentially performed plural times to derive the most effective operation from the individual evaluation results.

A second feature of the method of the present invention is to employ the optimal technique search method, wherein said evaluation device according to the first feature of the method of the present invention stores coordinate data for forming the neural network, an evaluation standard for the execution device, the node, and the value of the numerical expression group as parameters in a database, when the execution device is operated, the evaluation device selects the parameters from the database, makes the selected parameters as the initial settings, and transmits the initial settings to the execution device, and the evaluation device receives the operation result of the execution device operated based on the initial settings, makes evaluation as the individual evaluation for the robot, stores the evaluation in the database, and searches for a combination of the initial settings capable of performing the most effective operation from information stored in the database.

A third feature of the method of the present invention is to employ the optimal technique search method, wherein said execution device according to the first or second feature of the method of the present invention includes an evaluation unit that detects an operation state of the execution device, and transmits the detection result to the evaluation device.

A forth feature of the method of the present invention is to employ the optimal technique search method, wherein said execution device according to the first or second feature of the method of the present invention forms the neural network based on the initial settings received from the evaluation device, a sensor unit included in the execution device detects the state of the environment as the input data, when the neural network is formed, the execution device inputs the input data to the neural network, thereby deriving the output data, and the output data is transmitted to the operation unit included in the execution device to perform the operation.

A fifth feature of the method of the present invention is to employ the optimal technique search method, wherein said node according to any one of the first to third feature of the method of the present invention includes, as parameters for discriminating the characteristics of the node, the coordinates of the node, the connection strength of a connection line connecting the plurality of nodes, a connection destination of the node, the potential of the node, and the rate of utilization of the numerical expression group in the node, and the numerical expression group includes, as parameters, a numerical expression indicating a calculation rule between the numerical expressions in the numerical expression group and a numerical expression indicating the degree of change of the parameters in the node.

A first feature of the system of the present invention is to employ an optimal technique search system comprising: an execution device that is initially set in an arbitrary environment so as to derive and perform an operation corresponding to the environment using a neural network; and an evaluation device that gives the initial settings to the execution device and evaluates the content of the operation of the execution device after the operation ends, wherein the evaluation device directs the execution device to perform the operation plural times and searches for the initial settings of the execution device in which the most effective operation is performed from the plurality of derived operation results, the execution device has a virtual cell division section therein, adjusts the number of nodes, which are virtual cells set by the evaluation device, in the cell division section based on the nodes and numerical expressions corresponding to virtual molecules required for cell division and transmits the detection result of a sensor provided therein as input data to the node to derive a signal required for the operation, thereby forming a neural network which is operated by the execution device.

A second feature of the system of the present invention is to employ the optimal technique search system, wherein said execution device according to the first feature of the system of the present invention includes: a sensor unit that detects the state of the environment; a search unit that forms the neural network; the operation unit that performs the operation based on data output from the search unit; an evaluation unit that detects whether the operation of the execution device succeeds or fails and evaluates the operation based on the detection result; and a communication unit that transmits the evaluation result of the operation and the initial settings between the evaluation device and the evaluation device.

A third feature of the system of the present invention is to employ the optimal technique search system, wherein said evaluation device according to the first or second feature of the system of the present invention includes: a database that stores parameters of the node and a function to be transmitted to the execution device and evaluation for the execution device; an individual defining module that extracts the values of the parameters of the node and the function from the database and makes the initial settings of the node and the function to be transmitted to the execution device; an individual evaluating module that makes individual evaluation for the execution device from the evaluation result of the operation received from the execution device and the initial settings transmitted to the execution device and stores the individual evaluation in the database; an execution management module that instructs the individual defining module, the individual evaluating module, and the execution device to perform each operation; and a communication unit that communicates with the execution device.

A forth feature of the system of the present invention is to employ the optimal technique search system, wherein said node according to any one of the first to third feature of the system of the present invention includes, as parameters for discriminating the characteristics of the node, the coordinates of the node, the connection strength of a connection line connecting a plurality of nodes, a connection destination of the node, the potential of the node, and the rate of utilization of the numerical expression group in the node.

A fifth feature of the system of the present invention is to employ the optimal technique search system, wherein said numerical expression group according to any one of the first to third feature of the system of the present invention includes, as parameters, a numerical expression indicating a calculation rule between the numerical expressions in the numerical expression group and a numerical expression indicating the degree of change of the parameters in the node.

Effects of the Invention

According to the invention, a cell differentiation mechanism is applied as a cell differentiation algorithm to a neural network. In this way, it is possible to discriminate phenotype and genotype which have not been discriminated by the genetic algorithm according to the related art. A process which is determined to be unnecessary to detect an optimal technique for solving problems is omitted. Therefore, it is possible to effectively search for an optimal technique.

Since a large number of unnecessary processes are omitted, it is possible to incorporate the neural network into a small system. In addition, it is possible to search for an optimal technique in real time.

BRIEF DESCRIPTION OF LETTERS AND NUMERALS

Figure 1:
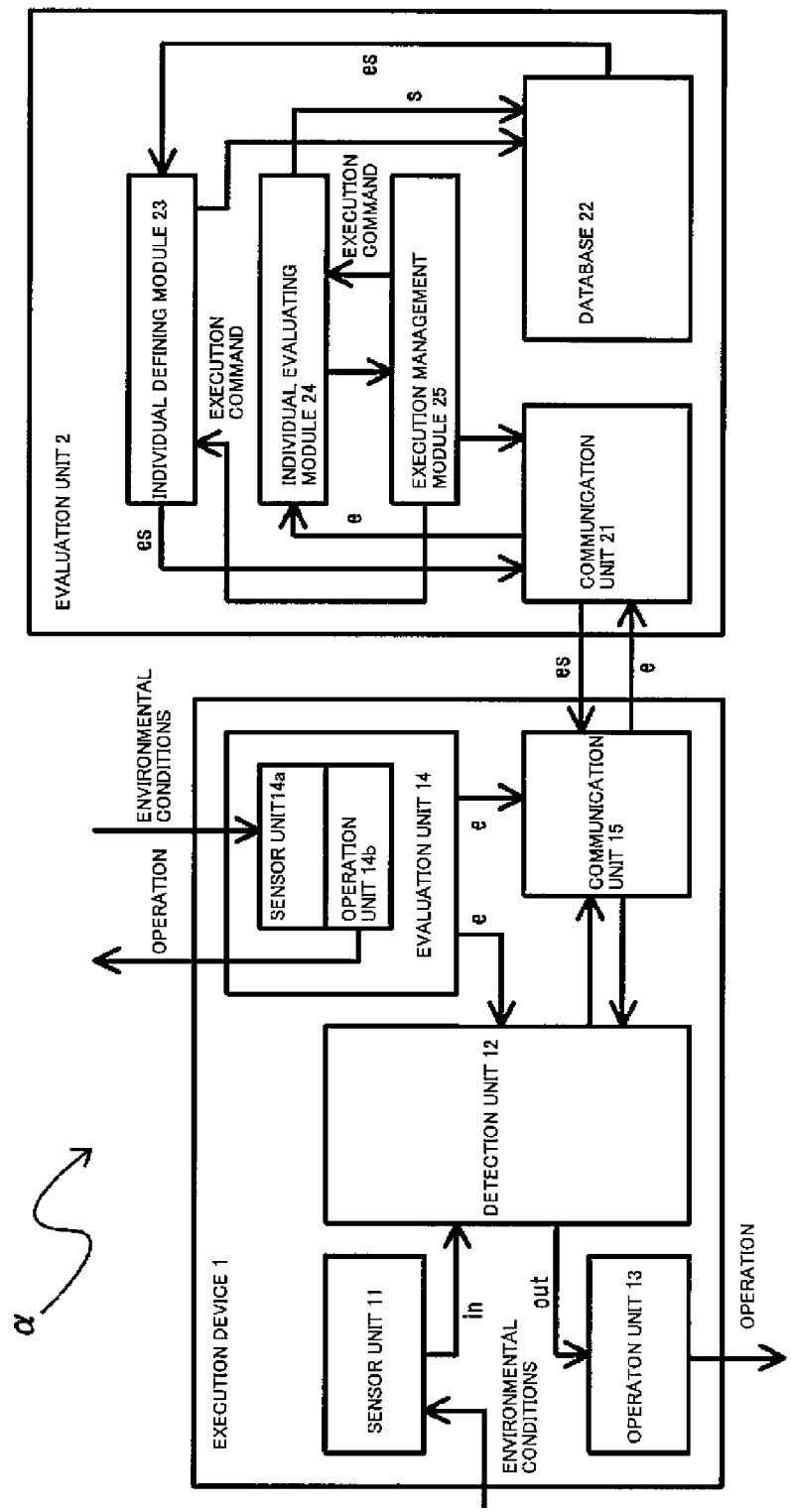
FIG. 1 is a system configuration diagram illustrating an example of a system according to the invention.

α, α' . . . OPTIMAL TECHNIQUE SEARCH METHOD AND SYSTEM
1 . . . execution device
11, 14a . . . sensor unit
11a . . . CCD camera
12 . . . detecting unit
12a . . . input data receiving unit
12b . . . input data signal conversion unit
12c . . . signal calculating unit
12d . . . output data signal conversion unit
12e . . . output data transmitting unit
13,14b . . . operation unit
14 . . . evaluation unit
15,21 . . . communication unit
2 . . . evaluation device
22 . . . database
23 . . . individual defining module
24 . . . individual evaluating module
25 . . . execution management module
in . . . input data
ins . . . input signal
out . . . output data
outs . . . output signal
e . . . evaluation information
es . . . initial settings
s . . . score evaluation
RP . . . execution unit parameters
R-01 . . . coordinate data
R-02 . . . score
R-03 . . . code
NP . . . node parameters
N-01 . . . coordinate data
N-02 . . . synaptic coupling strength
N-03 . . . synapse connection destination
N-04 . . . node potential
N-05 . . . object execution frequency
OP . . . object parameters
O-01 . . . calculation occurrence probability
O-02 . . . function occurrence probability
N1 . . . k . . . node

BEST MODE FOR CARRYING OUT THE INVENTION

Hereinafter, an example of a system configuration according to the invention, an algorithm in the system configuration, and an embodiment will be described with reference to the accompanying drawings.

(Example of System Configuration)

FIG. 1 is a diagram illustrating the configuration of a system according to the invention. As illustrated in FIG. 1, an optimal technique search system a includes an execution device 1 that senses an operation environment using a sensor and performs an optimal operation using a neural network and an evaluation device 2 that performs a basic setting operation for the execution device 1 and evaluates the operation result of the execution device 1.

The execution device 1 includes a sensor unit 11 that detects an operation environment and the operation conditions of the execution device 1 and changes the conditions into input data in, a detecting unit 12 that derives output data out required for operations based on input data in which is sensed by the sensor unit 11, an operation unit 13 that performs operations based on the output data out received from the detecting unit 12, an evaluation unit 14 that evaluates the operation of the execution device 1, and a communication unit 15 that transmits evaluation data for the evaluation unit 14 or the operation conditions of the operation unit 13 obtained by the sensor unit 11 to the evaluation device 2.

The sensor unit 11 includes a sensor that senses environmental conditions generated by a natural phenomenon or machines, such as electricity, magnetism, heat, sound, and light, and the type of sensor can be appropriately changed depending on the content of the operation of the execution device 1. For example, when the user wants to visually detect a variation in the state of a given space, a CCD camera or an image sensor, such as a hyper-spectral sensor, may be used.

Figure 2:
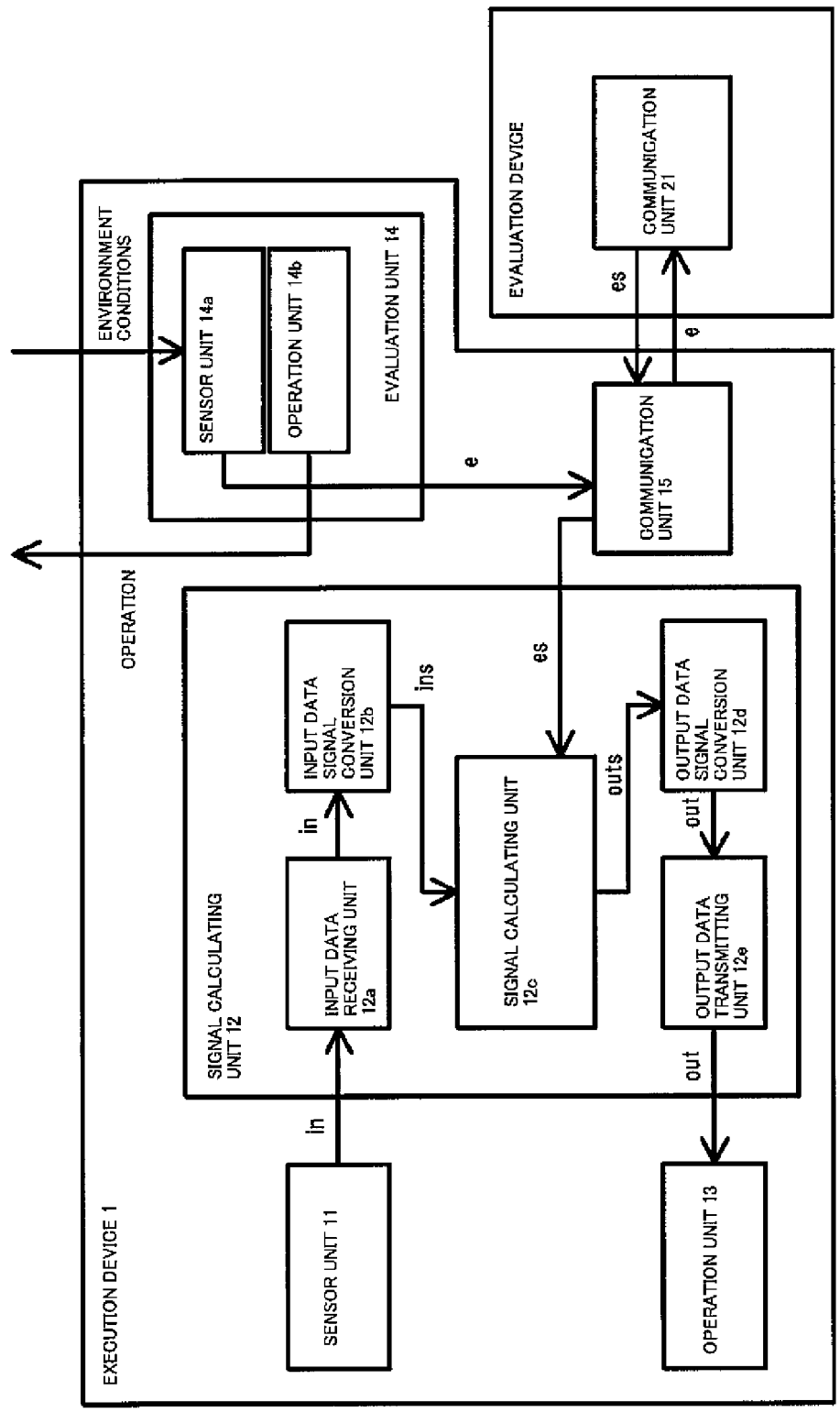
FIG. 2 is a functional block diagram illustrating a detecting unit 12 in the system according to the invention.

FIG. 2 illustrates the detailed structure of the detecting unit 12 in the execution device 1.

As described above, the detecting unit 12 is a processing unit that derives data for the operation to be performed by the operation unit 13 for a given purpose from the environmental conditions sensed by the sensor unit 11 and includes an input data receiving unit 12a that receives the input data in input from the sensor unit 11, an input data signal conversion unit 12b that converts the input data in from the input data receiving unit 12a into an input data signal ins, a signal calculating unit 12c into which a neural network is incorporated and which calculates output data signal outs required for the operation of the operation unit 13 based on the input data signal ins received from the input data signal conversion unit 12b, an output data signal conversion unit 12d that receives the output data signal outs from the signal calculating unit 12c and converts the output data signal outs into output data out which can be applied to the operation unit 13, and an output data transmitting unit 12d that transmits the output data out to the operation unit 13.

The neural network is used in the signal calculating unit 12c so that the signal calculating unit 12c derives the output data signal outs based on the input data signal ins. The algorithm of the neural network will be separately described in detail.

Similarly to the sensor unit 11, the operation unit 13 may include necessary operation devices and machines according to the content of the operation of the execution device 1 and the type thereof is not particularly limited. For example, a driving motor may be used to move the execution device 1, an actuator may be used to move an arm provided in the execution device 1, or an actuator may be used to lift and lower the body part of the execution device 1.

The evaluation unit 14 includes a sensor unit 14a that detects the operation conditions of the execution device 1 which are used to evaluate the execution device 1 and an operation unit 14b which is an evaluation unit and uses the result of the operation unit 14b to evaluate the execution device 1. As described in the following example, the operation unit 14b is not necessarily provided.

For example, when the execution device 1 is used in order to collect and select a given material, the operation unit 13 is moved to a target material to be evaluated by the execution device 1 and the evaluation unit 14 tries to collect the target material. When the collection succeeds (or fails), the execution device 1 transmits a signal having the evaluation result indicating that the target operation has succeeded (or failed) as evaluation information e to the evaluation device 2 through the communication unit 15.

As another example, when the execution device 1 is used in order to sprinkle water, radiate visible light or radiation, or blow air, the sensor unit 14a detects environmental conditions, such as humidity or temperature, in advance. After the operation unit 13 is moved to a predetermined position, the sensor unit 14a detects a variation in the conditions and the execution result (success/failure) of the operation is transmitted as the evaluation information e to the evaluation device 2.

In the above-mentioned example, when the execution result of the operation of the execution device 1 can be determined by the detection of the environmental conditions, the evaluation unit 14 may include units other than the sensor unit 14a. The operation of the evaluation unit 14 is not limited to the detection of the conditions. When a collection operation is performed or the sensor unit 14a needs to be moved to detect conditions, the evaluation unit 14 may further include an operation unit 14b.

The communication unit 15 of the execution device 1 and a communication unit 21 of the evaluation device 2 are units for communication therebetween. The operation evaluation information e of the execution device 1 is transmitted to the communication unit 21 through the communication unit 15. The communication unit 21 transmits the evaluation information e to an individual evaluating module 22 and the evaluation device 2 evaluates the execution device 1.

Next, the evaluation device 2 will be described. The evaluation device 2 is a processing device that performs a neural network initial setting process on the execution device 1 before the execution device 1 operates, stores the evaluation information e obtained by the evaluation unit 14 to evaluate the content of the operation of the execution device 1 after the execution device 1 operates for an arbitrary period of time, which is a section, as the individual evaluation result of the execution device 1, and manages the evaluation information e for the operations which are performed plural times or a plurality of execution devices 1, thereby deriving initial settings capable of performing the most effective operation as an optimal technique.

The evaluation device 2 includes the communication unit 21 that transmits initial settings es to the execution device 1 and receives the operation result of the execution device 1 evaluated by the evaluation unit 14, a database 22 that stores a combination group of the parameters of a node N, the evaluation information e for the execution device 1, and individual information eo, an individual defining module 23 that transmits the initial settings es from the database 22 to the execution device 1, an individual evaluating module 24 that evaluates the execution device 1 based on the evaluation information e for the execution device 1 transmitted from the execution device 1 and writes and stores score evaluation s in which the evaluation result is graded to the database 22, and an execution management module 25 that transmits an operation execution command to the individual defining module 23 or the individual evaluating module 24 and the execution device 1.

Each processing unit of the system according to the invention has been described above. In the system according to the invention, all components may be provided in the same device. For example, the evaluation device 2 is provided in the execution device 1. In addition, the evaluation device 2 may be provided in a personal computer, and the personal computer and the execution device 1 may be connected to each other by wire or wirelessly such that data is exchanged therebetween.

A plurality of execution devices 1 may be connected to the evaluation device 2. When the evaluation information e is obtained from the plurality of execution devices 1 once, it is possible to effective search for an optimal technique.

(Cell Differentiation Algorithm)

Next, the cell differentiation algorithm which is used in the neural network formed in the signal calculating unit 12 in order to search for the optimal technique will be described.

An object of the invention is to systematize a change in the state of cells or molecules with the progress of cell differentiation during cell division, as described in the cell differentiation mechanism disclosed in Non-patent Literature 1.

Since the terms related to the cell differentiation and a cell differentiation state are based on Non-patent Literature 1, the detailed description of the cell differentiation mechanism disclosed in Non-patent Literature 1 will not be repeated.

Non-patent Literature 1: What is life?—Introduction to complex systems biology, University of Tokyo Press, Kunio Kaneko, 2003

First, how to apply each element required for cell differentiation to the system in the systematization of the cell differentiation mechanism described in Non-patent Literature 1 will be described.

In the cell differentiation algorithm, in the invention, the signal calculating unit 2 virtually performs cell differentiation using three elements, that is a cell division space (medium) RP, a node (cell) NP, and a molecule OP. Each element stores a data group including numerical values or numerical expressions as parameters indicating the characteristics thereof and data items in each element perform division using calculation.

As described in Non-patent Literature 1, in a cell differentiation process, when the number of cells is increased by division, the state of the molecules in the cell is changed. In the invention, the change in the state of the molecules in the cell is used to perform cell division in a virtual cell division space having an input side and an output side. A node N close to an initial value is connected to the input side and a node N whose parameters are changed after cell differentiation is connected to the output side. A signal is transmitted from the input side where division occurs to a node group. In this way, the signal received by the output side is the optimal result for the input signal.

Next, the process sequence of the neural network to which the cell differentiation algorithm performed by the signal calculating unit 12c will be described with reference to the concept of the parameters illustrated in FIG. 3 and the flowchart illustrated in FIG. 4.

Figure 3:
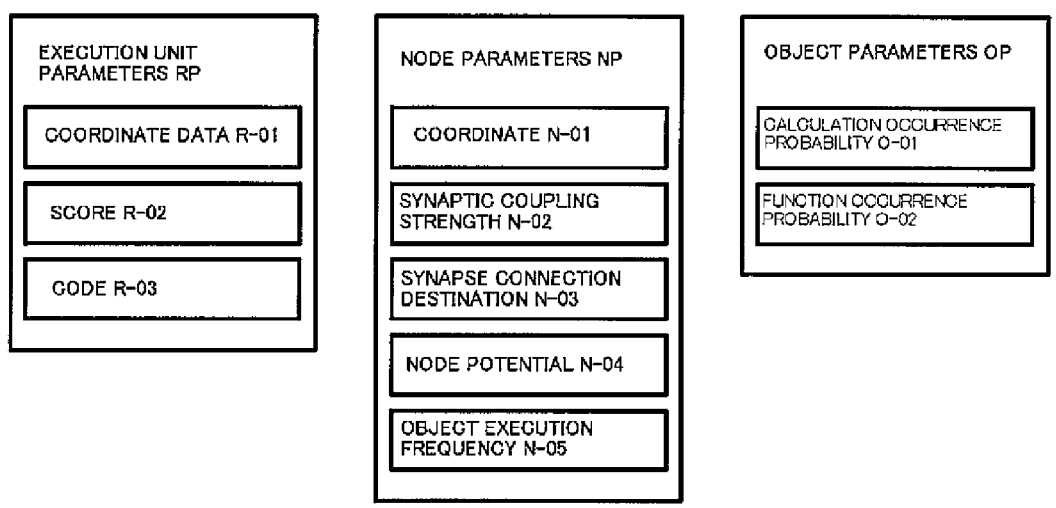
FIG. 3 is a diagram illustrating the outline of parameters in a genetic algorithm according to the invention.
Figure 4:
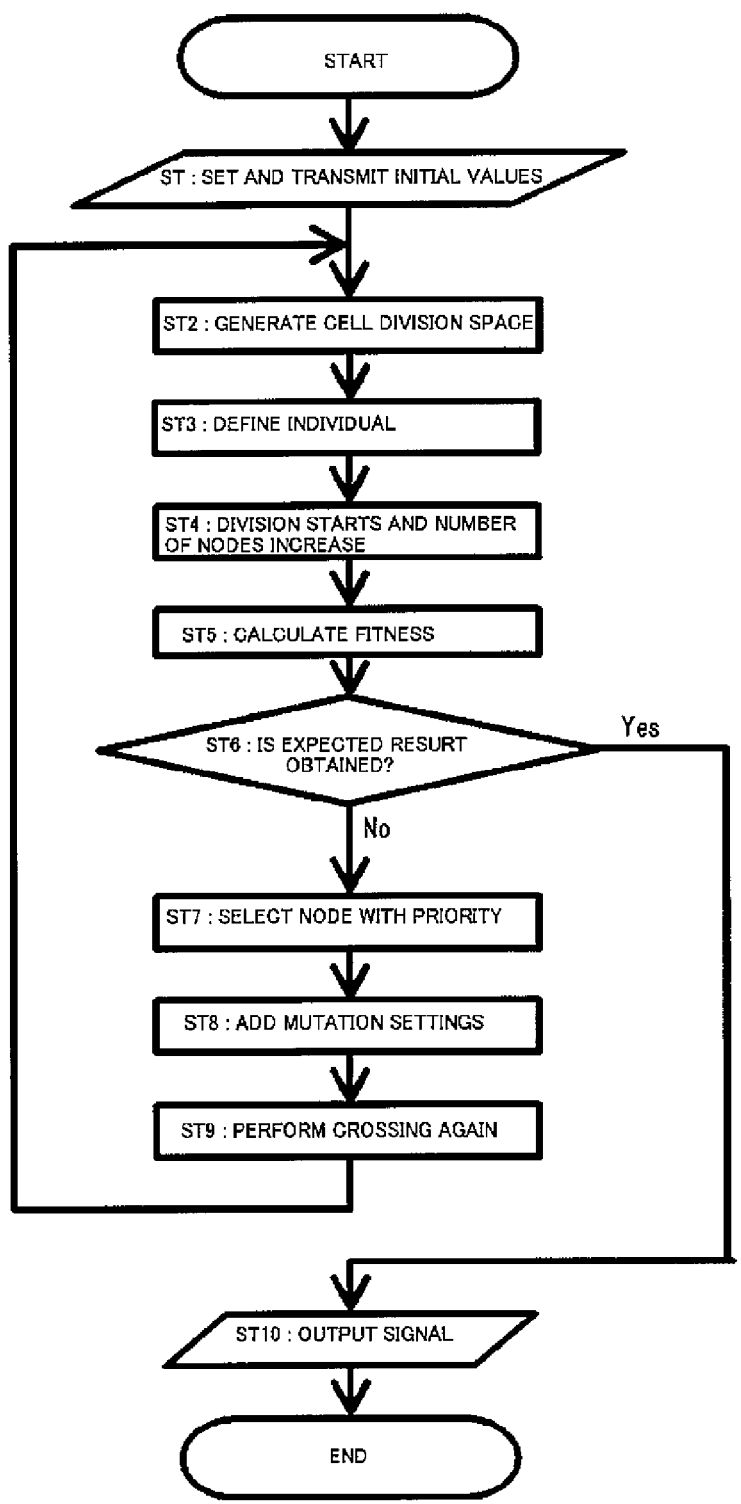
FIG. 4 is a flowchart illustrating the genetic algorithm according to the invention.

FIG. 3 illustrates the content of execution unit parameters RP which are allocated to the execution device 1 and are stored in the individual defining module 23, node parameters NP which are sets as the initial values of the node N, and object parameters OP including a numerical expression group used to divide the node N.

First, the execution unit parameters RP are for creating a virtual cell division space and are set as the initial values of the execution device 1 whenever the cell differentiation algorithm is executed.

The execution unit parameters RP include coordinate data R-01 which numerically expresses coordinate information required for the cell division space, the evaluation score R-02 of the differentiated execution device 1, and a code R-03 which corresponds to the genetic code of the cell at the node N allocated to each execution device 1. The score R-02 is for evaluating and quantifying the degree of efficiency of the operation to be performed by the execution device 1 and is received from the evaluation unit 14.

The node parameters NP include a node coordinate N-01 indicating the coordinates of a node N, which is a first node arranged in the coordinate data R-01, synaptic coupling strength N-02 indicating the degree of synaptic coupling of the node N, a synapse connection destination N-03 indicating a node N, which is the connection destination of a synapse, node potential N-04 indicating the potential of the connection destination node N, and an object execution frequency N-05 indicating the number of objects in the node N. These parameters are expressed numerically.

The node potential N-04 is not used during cell division and indicates a threshold value that makes the node N transmit a signal to another node. It is assumed that the node potential N-04 is the sum of the values transmitted from other nodes.

The object execution frequency N-05 indicates the number of objects O (molecules) in the node N and is set such that the number of objects in the node N is reduced by half whenever division occurs.

Next, the object parameters OP will be described. The object O corresponds to the molecule in cell division and there are various kinds of molecules in terms of biology. Therefore, in order to approximate the actual cell division state, it is necessary to define various kinds of objects O1, . . . , k (k is a natural number) and various kinds of object parameters OP1, . . . , k corresponding to the objects in the initial setting stage.

The object parameters OP includes a calculation occurrence probability O-01 indicating a reaction coefficient between the objects and a function occurrence probability O-02 which changes the value of each of the node parameters NP. The object parameters are expressed numerically.

The calculation occurrence probability O-01 sets the reaction coefficients of the other set objects O2 to Ok (k is a natural number) and a new object Ok+1 generated by the reaction in the object O1 and sets them in all of the objects O.

The set value of the function occurrence probability O-02 can be appropriately changed depending on the function of the object O. A numerical expression required when the initial value is set to the function occurrence probability O-02 is set. For example, a numerical expression for changing the set value of the synaptic coupling strength N-02 or the node potential N-04 is set.

When the individual defining module 23 sets the above-mentioned values as the initial values to the signal calculating unit 12c, virtual cell division is performed in the signal calculating unit 12c.

Next, the sequence of the cell differentiation algorithm of the signal calculating unit 12c will be described with reference to the flowchart illustrated in FIG. 4.

First, the individual defining module sets the initial values of the execution unit parameters RP, the node parameters NP, and the object parameters OP and transmits the parameters to the signal calculating unit 12c (ST1).

In this case, the set parameters may be stored in the database 22 and the individual defining module may set the parameters at random or with given regularity or it may rewrite the parameters, if necessary.

The node parameters NP are set for each execution device 1. However, the same object parameters OP are set to a plurality of execution devices 1 used for evaluation in order to compare and evaluate the operations of the execution devices 1 under the same conditions.

The signal calculating unit 12c generates a virtual cell division space based on the initial settings es received from the individual defining module 23 and forms a neural network to which the cell differentiation algorithm is applied (ST2).

Then, the signal calculating unit 12c arranges the nodes N in the neural network from the node parameters NP and performs individual definition (ST3). Then, the signal calculating unit 12c arranges the objects O at random and starts division when the number of objects O arranged reaches a predetermined value (ST4).

The node N1 selects the calculation occurrence probability O-01 or the function occurrence probability O-02 from the numerical expression group in the object parameters OP based on the execution coefficient N-05 and applies the values of the node parameters N. In this way, virtual cell division is performed and the node N1 is continuously divided to nodes N2 and N3.

In this case, it is assumed that the node parameters NP of the nodes N2 and N3 are substantially the same as those of the node N1 except that the execution coefficient N-05 is reduced by half.

Similarly to the division of the node N1, the nodes N2 and N3 select the calculation occurrence probability O-01 or the function occurrence probability O-02 from a random numerical expression group and apply the values of the node parameters N. In this way, the nodes N2 and N3 are divided into nodes N4, N5, N6, and N7. This process is repeated performed and the total number of nodes N increases.

Figure 5:
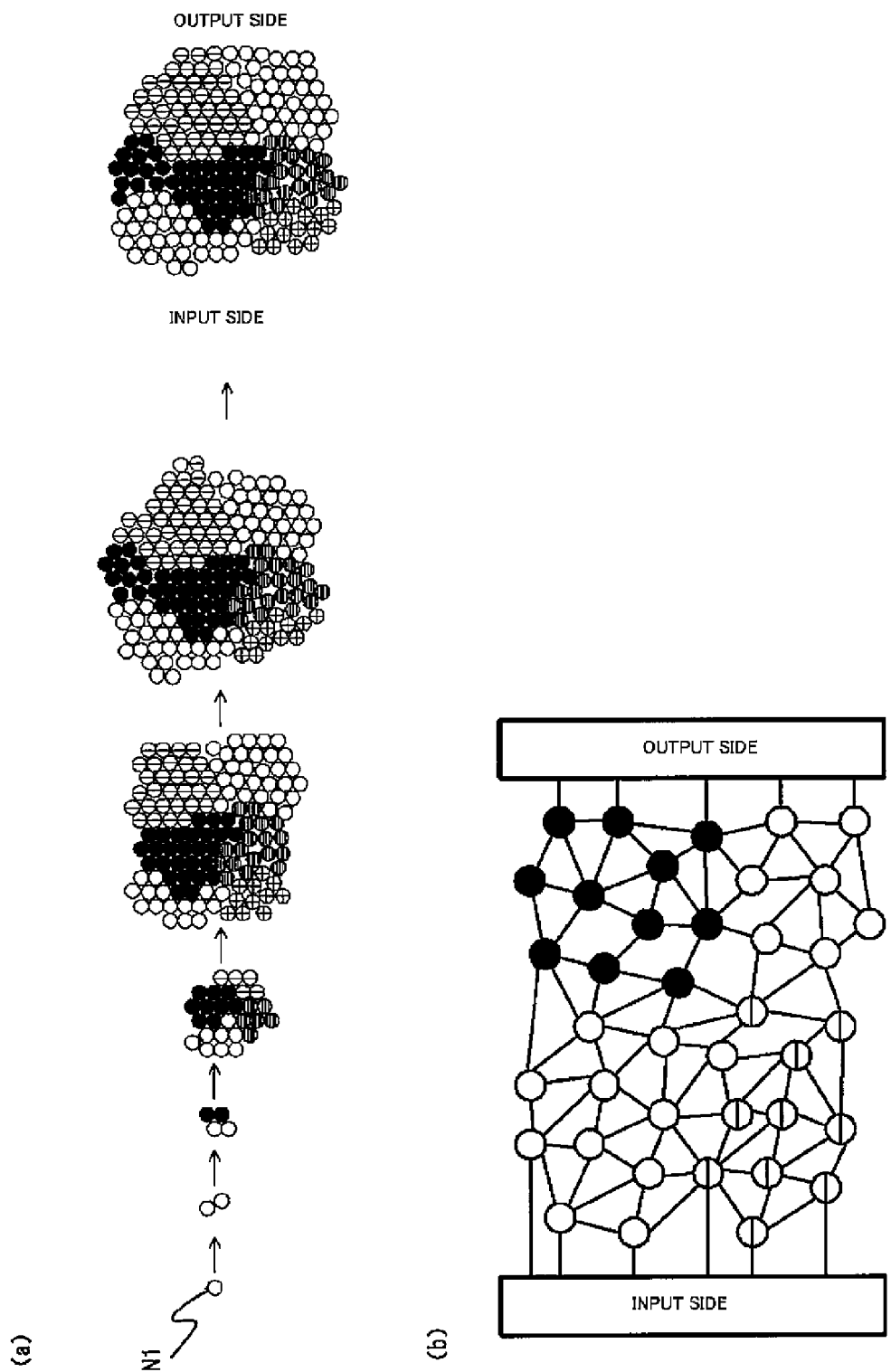
FIG. 5(*a*) is a diagram illustrating an increase in the number of nodes and FIG. 5(*b*) is a diagram illustrating the structure of a main portion of a neural network.

FIG. 5(a) is a diagram visibly illustrating an aspect in which the number of nodes increases gradually after the node N1 is arranged and an example in which division is repeated to change the characteristics of the object parameters OP in the node N. As illustrated in FIG. 5(a), during an increase in the number of nodes N1, . . . , k (k is a natural number), in the initial stage in which the number of nodes increases, division is frequently performed and the number of nodes N increases tremendously. However, since the number of numerical expression groups in the object parameters OP arranged in the cell division space is set to a predetermined value, the nodes N1, . . . , Nk start to compete with each other to acquire the object parameters OP. As a result, whenever division is performed, the execution coefficient N-05 is reduced and the number of divisions is reduced. When a given number of divisions end, the number of nodes N1, . . . , Nk tends to be stabilized. During division, the characteristics of the object included in the node N vary depending on the position of the node N, and the nodes N with different characteristics are arranged on the input side and the output side.

FIG. 5(b) is a diagram illustrating an aspect in which the stabilized nodes N1, . . . , k are actually connected to the input side and the output side by synapses based on FIG. 5(a), thereby forming a neural network. When the nodes N are connected to the input side and the output side by synapses in the formed neural network as illustrated in FIG. 5(b), the signal calculating unit 12c transmits the input signal ins from the input side to the nodes N1, . . . , k. Then, the signal is transmitted between the node N1, . . . , k and the signals output from the output-side nodes N1, . . . , k are output as the output signal outs for the operation of the operation unit 13. The fitness of the output signal outs at that time is calculated (ST5) and it is determined whether the calculation result is the expected result (ST6). Data for the fitness, which is a criterion, may be included in the initial settings es or it may be stored in the signal calculating unit 12c in advance.

When the expected result is not obtained, a node with priority is selected from the nodes N1, . . . , k (ST7). If necessary, the settings of the selected node Nk are rewritten in order to generate a virtual mutation (ST8) and are crossed again (ST9), thereby performing new division. The process after ST3 is repeatedly performed until the expected characteristics are obtained. Similarly to the data for determining the fitness, data used for the mutation is included in the initial settings es or the signal calculating unit 12c.

When the expected characteristics are obtained in ST6, the obtained signal is output (ST10) and the process ends. In this way, the neural network is completed. The above is the description of the outline of the algorithm according to the invention using the cell differentiation mechanism.

Embodiment

Figure 6:
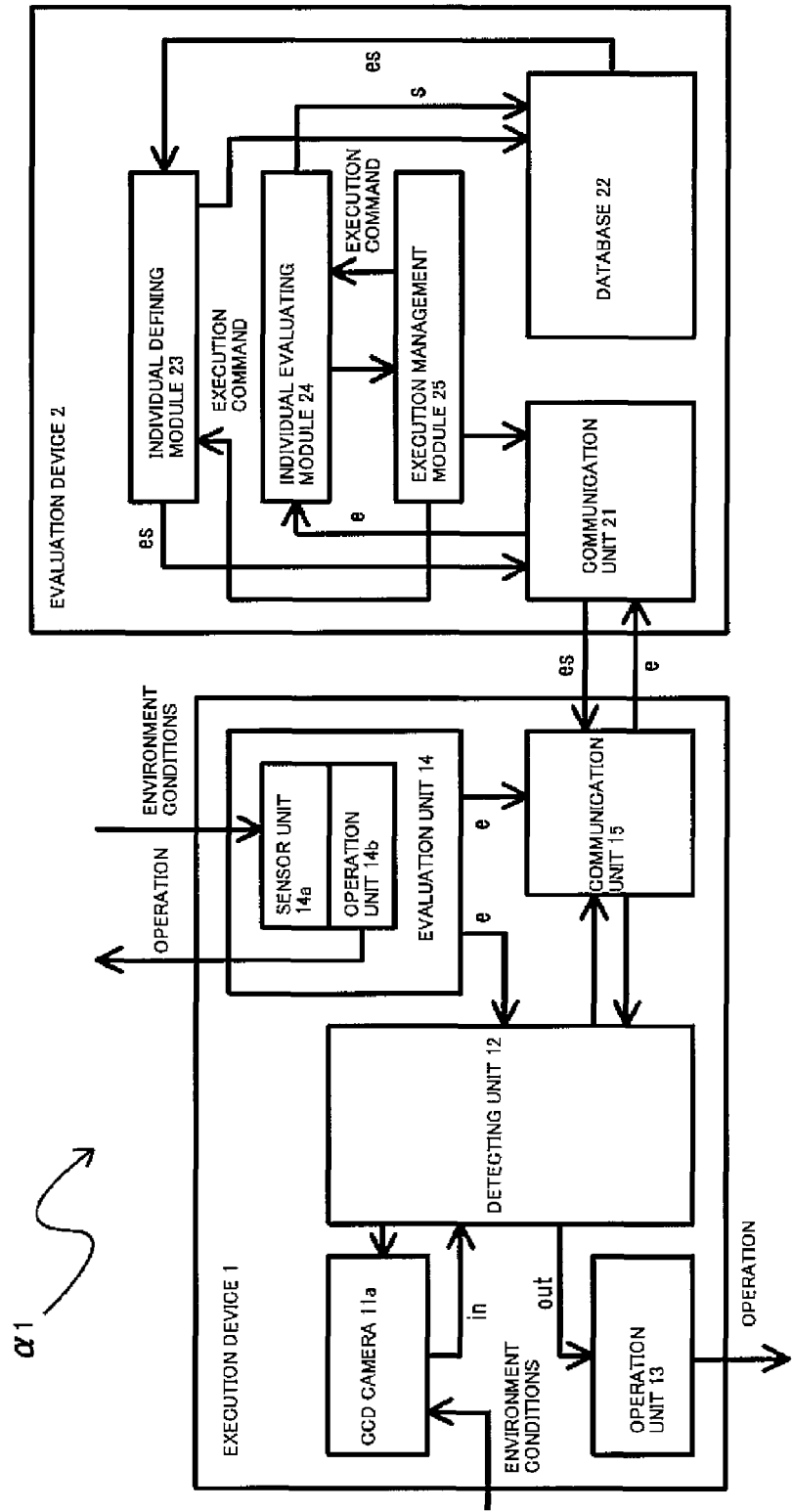
FIG. 6 is a diagram illustrating the structure of a system according to an embodiment of the invention.

Next, an embodiment will be described with reference to the configuration diagram illustrated in FIG. 6. In this embodiment, a waste collection robot using the system according to the invention is given as an example, but the use of the system according to the invention is not limited thereto.

In this embodiment, it is assumed that the waste collection execution device 1 is a robot that collects wastes, such as paper or cans, in a place, such as a factory. A CCD camera 11a which is provided as the sensor unit captures an image in an operation environment and the operation unit 13 is moved to the position where there is a foreign material based on image data obtained by the CCD camera 11a. When the waste collection unit 14 serving as an evaluation unit recognizes the foreign material using the sensor, it collects the foreign material as waste.

First, in the evaluation device 2, the individual defining module 23 transmits the initial settings es including the execution unit parameters RP, the node parameters NP, and the object parameters OP to the communication unit 15 of the execution device 1 through the communication unit 21. The communication unit 15 receives the initial settings es, transmits the initial settings es to the signal calculating unit 12c, and transmits a start command to the sensor unit 11.

The sensor unit 11 captures an operation environment using the CCD camera in order to collect waste. When a foreign material (waste) is detected, the sensor unit 11 transmits the input data in to the input data receiving unit 12a. The input data receiving unit 12a transmits the received input data in to the input data signal conversion unit 12b.

The input data signal conversion unit 12b converts the received input data in into an input data signal ins for a neural network and transmits the input data signal ins to the signal calculating unit 12c.

The signal calculating unit 12c starts to adjust the number of nodes based on the initial settings es received from the communication unit 15 after the nodes N are arranged, and forms a neural network.

When the neural network is completed, the signal calculating unit 12c inputs the input data signal ins to the completed neural network. In addition, when the input data signal ins is transmitted from the data signal conversion unit before the neural network is formed, the signal calculating unit 12c stores the input data signal ins without any change and starts the input of the input data signal ins to the neural network after the neural network is completed.

When the output data signal outs is output by the transmission of the signals of the nodes N1, . . . , k in the neural network, the signal calculating unit 12c receives the output data signal outs and transmits it to the output data signal conversion unit 12d.

When the output data signal conversion unit 12d converts the output data signal outs into output data out for operation, the output data out is transmitted to the operation unit 13 through the output data transmitting unit 12e. The operation unit 13 is moved to a designated position based on the output data out When the operation of the operation unit 13 ends, the sensor unit 14a of the waste collection unit 14 detects a foreign material. When there is a foreign material, the operation unit 14b collects waste and the waste collection unit 14 transmits evaluation information e indicating that the collection of waste has succeeded to the evaluation device 2 through the communication unit 15. When the sensor unit 14a may not detect a foreign material, the waste collection unit 14 transmits evaluation information e indicating that the collection of waste has failed to the evaluation device 2.

The individual evaluating module 24 creates score evaluation s including unique data of the waste collection execution device 1 and the robot collection result from the received evaluation information e and transmits the creation result of the score evaluation s to the execution management module 25. Then, the execution management module 25 issues a command to write the score evaluation s to the database and the score evaluation s is written to the database.

The execution device 1 repeats the waste search and collection operation for a predetermined period of time and the operation result is transmitted to the evaluation device 2. The evaluation device 2 stores the evaluation data of the execution device 1.

When a predetermined period of time ends, the evaluation device 2 sums up the score evaluation s for the waste collection conditions of the execution device 1 and stores it as evaluation for the node N1 in the execution device 1 in the database 22.

When it is necessary to perform evaluation again, the evaluation device 2 transmits the initial settings es to the execution device 1. Then, waste collection and evaluation are repeated.

The evaluation device 2 compares the score data of an arbitrary number of execution devices 1 and obtains the parameters of the node N1 in the execution device 1 with the best result as the optimal parameters.

The optimal technique search system according to the embodiment of the invention has been described above, but the invention is not necessarily limited to the above-mentioned unit. Various modifications and changes of the invention can be made within the range of the claims.

INDUSTRIAL APPLICABILITY

The optimal technique search method and the optimal technique search system according to the invention can effectively derive output data from the neural network in real time. Therefore, it is possible to achieve a neural network on software.

The invention claimed is:

1. An optimal technique search method that is performed in a system including an execution device that is initially set in an arbitrary environment so as to derive and perform an operation corresponding to the environment using a neural network and an evaluation device that gives initial settings to the execution device and evaluates content of the operation of the execution device after the operation ends, the evaluation device directing the execution device to perform the operation plural times and deriving the initial settings of the execution device in which a most effective operation is performed from the plurality of derived operation results as an optimal technique, the method comprising:
  an individual defining step of allowing the evaluation device to make initial settings from a combination of a virtual cell and a molecule required for cell division and transmit the initial settings to the execution device;
  an execution device operating step of allowing the execution device to create a virtual cell division space based on the initial settings, arrange nodes included in the initial settings, perform a calculation process based on a function to divide the nodes, thereby forming a neural network, input data detected by a sensor provided therein to the neural network after the neural network is formed, thereby deriving output data, operate an operation unit provided therein based on the output data, and transmit the operation result to the evaluation device; and an individual evaluating step of allowing the evaluation device to create individual evaluation for the execution device based on the received operation result, wherein the individual defining step, the execution device operating step, and the individual evaluating step are sequentially performed plural times to derive the most effective operation from the individual evaluation results.

2. An optimal technique search method according to claim 1, wherein:

the evaluation device stores coordinate data for forming the neural network, an evaluation standard for the execution device, a node, and a value of a numerical expression group as parameters in a database;

when the execution device is operated, the evaluation device selects the parameters from the database, makes the selected parameters as the initial settings, and transmits the initial settings to the execution device; and the evaluation device receives the operation result of the execution device operated based on the initial settings, makes evaluation as the individual evaluation for the robot, stores the evaluation in the database, and searches for a combination of the initial settings capable of performing the most effective operation from information stored in the database.

3. An optimal technique search method according to claim 1, wherein the execution device includes an evaluation unit that detects an operation state of the execution device, and transmits the detection result to the evaluation device.

4. An optimal technique search method according to claim 1, wherein:

the execution device forms the neural network based on the initial settings received from the evaluation device;

a sensor unit included in the execution device detects the state of the environment as the input data;

when the neural network is formed, the execution device inputs the input data to the neural network, thereby deriving the output data; and the output data is transmitted to the operation unit included in the execution device to perform the operation.

5. An optimal technique search method according to claim 1, wherein:

a node includes, as parameters for discriminating the characteristics of the node, the coordinates of the node, the connection strength of a connection line connecting the plurality of nodes, a connection destination of the node, a potential of the node, and a rate of utilization of a numerical expression group in the node, and the numerical expression group includes, as parameters, a numerical expression indicating a calculation rule between numerical expressions in the numerical expression group and a numerical expression indicating a degree of change of the parameters in the node.

6. An optimal technique search system comprising:

an execution device that is initially set in an arbitrary environment so as to derive and perform an operation corresponding to the environment using a neural network; and an evaluation device that gives initial settings to the execution device and evaluates content of the operation of the execution device after the operation ends, wherein the evaluation device directs the execution device to perform the operation plural times and searches for the initial settings of the execution device in which a most effective operation is performed from a plurality of derived operation results, wherein the execution device has a virtual cell division section therein, adjusts a number of nodes, which are virtual cells set by the evaluation device, in the cell division section based on the nodes and numerical expressions corresponding to virtual molecules required for cell division and transmits a detection result of a sensor provided therein as input data to the node to derive a signal required for the operation, thereby forming a neural network which is operated by the execution device.

7. An optimal technique search system according to claim 6, wherein the execution device includes:

a sensor unit that detects the state of the environment;

a search unit that forms the neural network;

the operation unit that performs the operation based on data output from the search unit;

an evaluation unit that detects whether the operation of the execution device succeeds or fails and evaluates the operation based on the detection result; and a communication unit that transmits the evaluation result of the operation and the initial settings between the evaluation device and the evaluation device.

8. An optimal technique search system according to claim 6, wherein the evaluation device includes:

a database that stores parameters of the node and a function to be transmitted to the execution device and evaluation for the execution device;

an individual defining module that extracts values of the parameters of the node and the function from the database and makes the initial settings of the node and the function to be transmitted to the execution device;

an individual evaluating module that makes individual evaluation for the execution device from the evaluation result of the operation received from the execution device and the initial settings transmitted to the execution device and stores the individual evaluation in the database;

an execution management module that instructs the individual defining module, the individual evaluating module, and the execution device to perform each operation; and a communication unit that communicates with the execution device.

9. An optimal technique search system according to claim 6, wherein the node includes, as parameters for discriminating characteristics of the node, coordinates of the node, a connection strength of a connection line connecting a plurality of nodes, a connection destination of the node, a potential of the node, and a rate of utilization of a numerical expression group in the node.

10. An optimal technique search system according to claim 6, wherein a numerical expression group includes, as parameters, a numerical expression indicating a calculation rule between the numerical expressions in the numerical expression group and a numerical expression indicating a degree of change of the parameters in the node.

11. An optimal technique search method according to claim 2, wherein:

the execution device forms the neural network based on the initial settings received from the evaluation device;

a sensor unit included in the execution device detects the state of the environment as the input data;

when the neural network is formed, the execution device inputs the input data to the neural network, thereby deriving the output data; and the output data is transmitted to the operation unit included in the execution device to perform the operation.

12. An optimal technique search method according to claim 2, wherein:
the node includes, as parameters for discriminating the characteristics of the node, the coordinates of the node, the connection strength of a connection line connecting the plurality of nodes, a connection destination of the node, a potential of the node, and a rate of utilization of a numerical expression group in the node; and
the numerical expression group includes, as parameters, a numerical expression indicating a calculation rule between numerical expressions in the numerical expression group and a numerical expression indicating a degree of change of the parameters in the node.

13. An optimal technique search method according to claim 3, wherein:
a node includes, as parameters for discriminating the characteristics of the node, the coordinates of the node, the connection strength of a connection line connecting the plurality of nodes, a connection destination of the node, a potential of the node, and a rate of utilization of a numerical expression group in the node, and
the numerical expression group includes, as parameters, a numerical expression indicating a calculation rule between numerical expressions in the numerical expression group and a numerical expression indicating a degree of change of the parameters in the node.

14. An optimal technique search system according to claim 7, wherein the evaluation device includes:
a database that stores parameters of the node and a function to be transmitted to the execution device and evaluation for the execution device;
an individual defining module that extracts values of the parameters of the node and the function from the database and makes the initial settings of the node and the function to be transmitted to the execution device;
an individual evaluating module that makes individual evaluation for the execution device from the evaluation result of the operation received from the execution device and the initial settings transmitted to the execution device and stores the individual evaluation in the database;
an execution management module that instructs the individual defining module, the individual evaluating module, and the execution device to perform each operation; and
a communication unit that communicates with the execution device.

15. An optimal technique search system according to claim 7, wherein the node includes, as parameters for discriminating characteristics of the node, coordinates of the node, a connection strength of a connection line connecting a plurality of nodes, a connection destination of the node, a potential of the node, and a rate of utilization of a numerical expression group in the node.

16. An optimal technique search system according to claim 8, wherein the node includes, as parameters for discriminating characteristics of the node, coordinates of the node, a connection strength of a connection line connecting a plurality of nodes, a connection destination of the node, a potential of the node, and a rate of utilization of a numerical expression group in the node.

17. An optimal technique search system according to claim 7, wherein a numerical expression group includes, as parameters, a numerical expression indicating a calculation rule between the numerical expressions in the numerical expression group and a numerical expression indicating a degree of change of the parameters in the node.

18. An optimal technique search system according to claim 8, wherein a numerical expression group includes, as parameters, a numerical expression indicating a calculation rule between the numerical expressions in the numerical expression group and a numerical expression indicating a degree of change of the parameters in the node.

* * * * *